US012763249B2

(12) United States Patent
Suzuki et al.

(10) Patent No.: US 12,763,249 B2
(45) Date of Patent: Oct. 13, 2026

(54) COIL COMPONENT AND MANUFACTURING METHOD THEREFOR

(71) Applicant: TDK Corporation, Tokyo (JP)

(72) Inventors: Masanori Suzuki, Tokyo (JP); Takuya Takeuchi, Tokyo (JP); Tomonaga Nishikawa, Tokyo (JP); Nobuya Takahashi, Tokyo (JP); Naoaki Fujii, Tokyo (JP)

(73) Assignee: TDK Corporation, Tokyo (JP)

( * ) Notice: Subject to any disclaimer, the term of this patent is extended or adjusted under 35 U.S.C. 154(b) by 878 days.

(21) Appl. No.: 17/971,177

(22) Filed: Oct. 21, 2022

(65) Prior Publication Data

US 2023/0126614 A1 Apr. 27, 2023

(30) Foreign Application Priority Data

Oct. 22, 2021 (JP) ................................ 2021-172991

(51) Int. Cl.
*H01F 27/32* (2006.01)
*H01F 27/29* (2006.01)
*H01F 41/12* (2006.01)

(52) U.S. Cl.
CPC ........... *H01F 27/323* (2013.01); *H01F 27/29* (2013.01); *H01F 41/122* (2013.01)

(58) Field of Classification Search
CPC .... H01F 27/323; H01F 41/122; H01F 27/255; H01F 2027/2809; H01F 27/2804; H01F 27/292; H01F 41/046
USPC ........................... 336/200, 83, 232, 205, 221
See application file for complete search history.

(56) References Cited

U.S. PATENT DOCUMENTS

2005/0195062 A1* 9/2005 Yoshida .............. H01F 27/2804 336/200
2016/0379750 A1 12/2016 Hamada et al.
2019/0088402 A1 3/2019 Kim et al.
2022/0122760 A1* 4/2022 Jung .................. H01F 17/0013
(Continued)

FOREIGN PATENT DOCUMENTS

JP 2015-133523 A 7/2015
JP 2015-213166 A 11/2015
JP 2017-011185 A 1/2017
(Continued)

OTHER PUBLICATIONS

Office Action dated Jul. 21, 2026, issued in corresponding Japanese Application No. 2025-149761.

*Primary Examiner* — John E Breene
(74) *Attorney, Agent, or Firm* — Rimon P.C.

(57) ABSTRACT

Disclosed herein is a coil component that includes a coil part having a structure in which a plurality of conductor layers each having a coil pattern are stacked in a coil axis direction through a plurality of interlayer insulating films, a first magnetic layer covering the coil part in the coil axis direction, and a second magnetic layer positioned in an inner diameter area of the coil part. The plurality of interlayer insulating films include a first interlayer insulating film positioned closest to the first magnetic layer. The first and second magnetic layers contact each other through an opening formed in the first interlayer insulating film. The opening has a shape whose diameter increases as a distance from an interface between the first and second magnetic layers increases.

8 Claims, 19 Drawing Sheets

(56) References Cited

U.S. PATENT DOCUMENTS

2022/0375679 A1 11/2022 Takeuchi et al.

FOREIGN PATENT DOCUMENTS

JP 2019-12729 A 1/2019
JP 2019012729 A * 1/2019

* cited by examiner

COIL COMPONENT AND MANUFACTURING METHOD THEREFOR

CROSS-REFERENCE TO RELATED APPLICATIONS

The disclosure of Japanese Patent Application No. 2021-172991 filed on Oct. 22, 2021 including the specification, drawings and abstract is incorporated herein by reference in its entirety.

BACKGROUND OF THE ART

Field of the Art

The present disclosure relates to a coil component and a manufacturing method therefor and, more particularly, to a coil component having a structure in which a coil part is embedded in a magnetic element body and a manufacturing method for such a coil component.

Description of Related Art

JP 2017-011185A discloses a coil component having a structure in which a coil part is embedded in a magnetic element body.

In the structure disclosed in JP 2017-011185A, voids are disadvantageously likely to occur at the interface between a first magnetic layer of the magnetic element body that covers the coil part in the coil axis direction and a second magnetic layer of the magnetic element body that is filled in the inner diameter area of the coil part. Such a problem becomes particularly conspicuous when such first and second magnetic layers are formed in different processes.

SUMMARY

It is therefore one of objects of the present disclosure to prevent, in a coil component having a structure in which a coil part is embedded in a magnetic element body, voids from occurring in the magnetic element body.

A coil component according to the present disclosure includes: a coil part having a structure in which a plurality of conductor layers each having a coil pattern are stacked in the coil axis direction through a plurality of interlayer insulating films; a first magnetic layer covering the coil part in the coil axis direction; and a second magnetic layer positioned in the inner diameter area of the coil part. The plurality of interlayer insulating films include a first interlayer insulating film positioned closest to the first magnetic layer. The first and second magnetic layers contact each other through an opening formed in the first interlayer insulating film. The opening has a shape whose diameter increases as the distance from the interface between the first and second magnetic layers increases.

A coil component manufacturing method according to the present disclosure includes: a first step of forming a protruding part and a dented part in a metal foil provided on the surface of a base; a second step of covering the surface of the metal foil with an insulating member to form a first interlayer insulating film having a thin part to which the shape of the protruding part has been transferred and a thick part to which the shape of the dented part has been transferred; a third step of alternately stacking, on the first interlayer insulating film, a plurality of conductor layers each having a coil pattern whose inner diameter area overlaps the thin part and a plurality of second interlayer insulating films; a fourth step of filling a second magnetic layer in the inner diameter areas of the coil patterns; a fifth step of removing the metal foil to expose the first interlayer insulating film; a sixth step of removing the thin part so as to expose the second magnetic layer; and a seventh step of forming a first magnetic layer covering the first interlayer insulating film such that the first and second magnetic layers contact each other. In the first step, the protruding and dented parts are formed such that the width of the protruding part decreases as the distance from the bottom surface of the dented part increases.

BRIEF DESCRIPTION OF THE DRAWINGS

The above features and advantages of the present disclosure will be more apparent from the following description of certain embodiments taken in conjunction with the accompanying drawings, in which.

DETAILED DESCRIPTION OF THE EMBODIMENTS

Some embodiments of the present disclosure will be explained below in detail with reference to the accompanying drawings.

Figure 1:
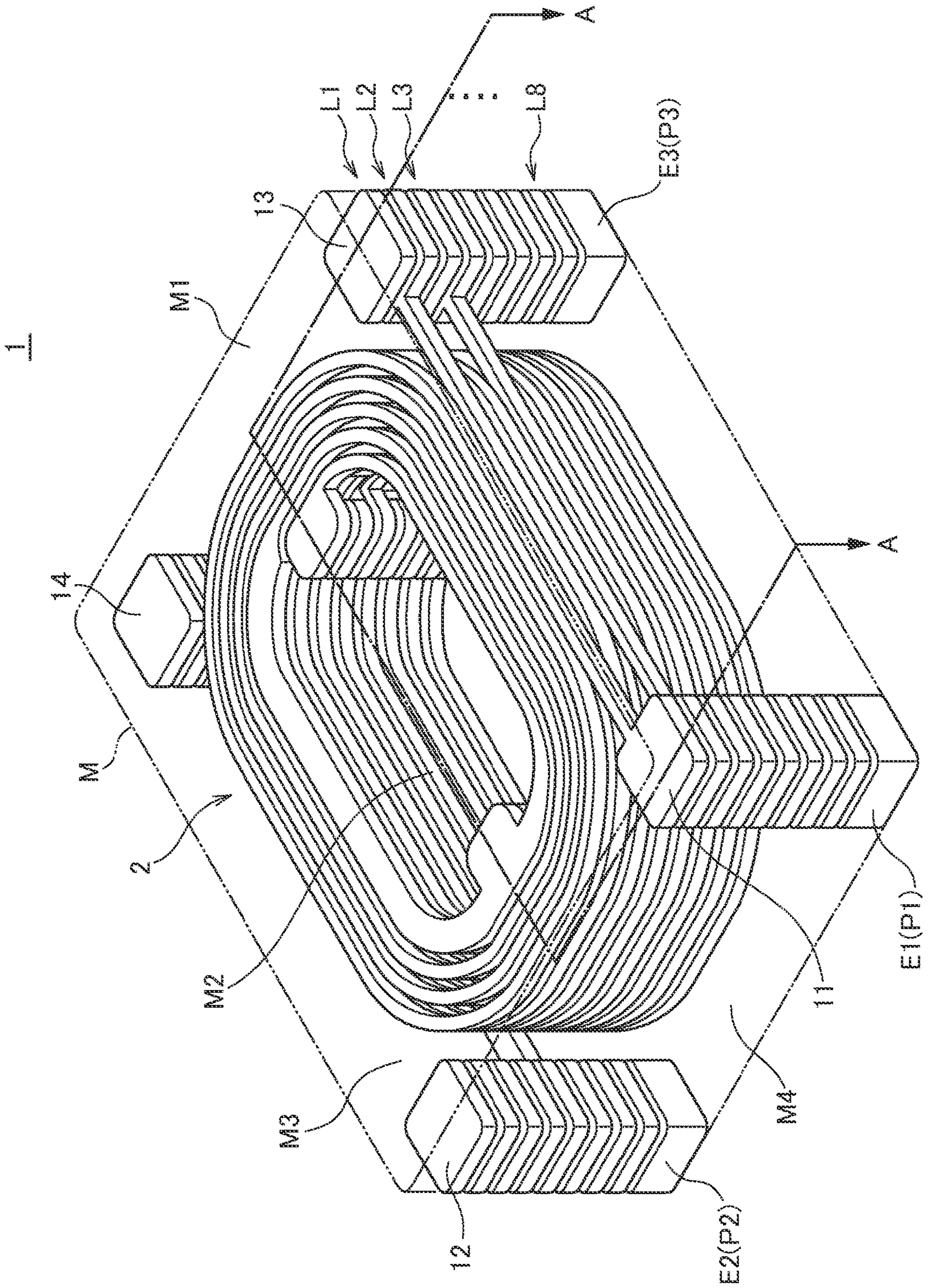
FIG. 1 is a schematic transparent perspective view for explaining the structure of a coil component 1 according to an embodiment of the present disclosure.
Figure 2:
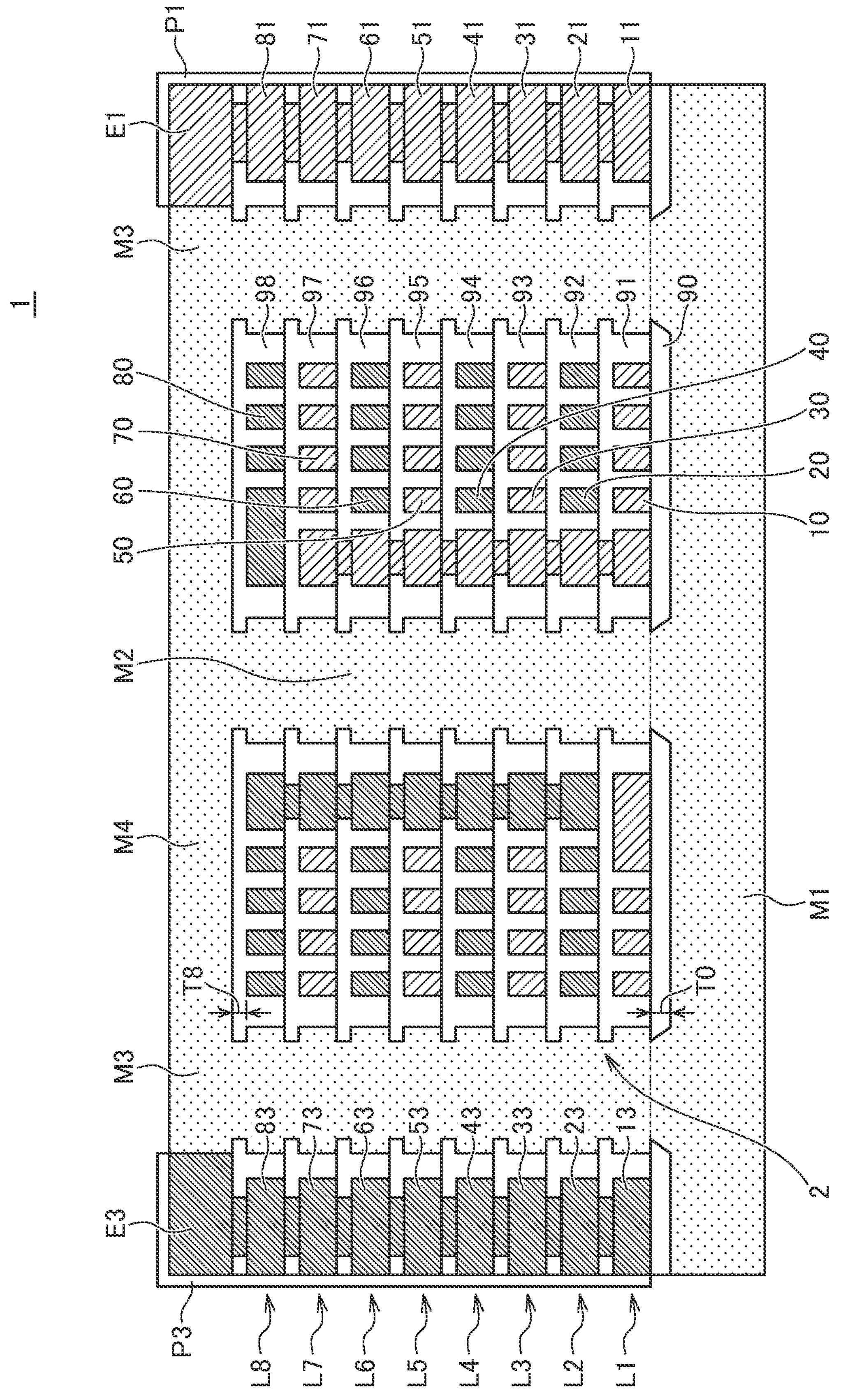
FIG. 2 is a schematic cross-sectional view taken along the line A-A in FIG. 1.

FIG. 1 is a schematic transparent perspective view for explaining the structure of a coil component 1 according to an embodiment of the present disclosure. FIG. 2 is a schematic cross-sectional view taken along the line A-A in FIG. 1.

The coil component 1 according to the present embodiment is a surface-mount type balun transformer and has a structure in which a coil part 2 is embedded in a magnetic element body M as illustrated in FIGS. 1 and 2. The coil part 2 includes interlayer insulating films 90 to 98 and conductor layers L1 to L8. The interlayer insulating films 90 to 98 and conductor layers L1 to L8 are alternately stacked in the coil axis direction. The magnetic element body M includes magnetic layers M1 to M4. The magnetic layer M1 covers the coil part 2 from one side in the coil axis direction, the magnetic layer M2 is provided in the inner diameter area of the coil part 2, the magnetic layer M3 is provided in the outside area of the coil part 2, and the magnetic layer M4 is covers the coil part 2 from the other side in the coil axis direction. Terminal electrodes E1 to E4 are exposed from the magnetic layer M4.

The interlayer insulating film 90 is positioned closest to and in contact with the magnetic layer M1. The interlayer insulating film 98 is positioned closest to and in contact with the magnetic layer M4. The interlayer insulating films 91 to 98 cover the conductor layers L1 to L8, respectively. A film thickness T0 of the interlayer insulating film 90 is larger than those of the interlayer insulating films 91 to 98. Thus, assuming that the film thickness of the interlayer insulating film 98 is T8, T0>T8 is satisfied. The film thickness T8 of the interlayer insulating film 98 is defined by the film thickness at a position where the conductor layer L8 is provided. The film thicknesses of the interlayer insulating films 91 to 97 are also defined in the same manner and may each be equal to the film thickness T8. The film thickness T8 is, for example, 10 μm. In this case, the film thickness T0 may be set to 10 μm or more, for example, about 15 μm to 20 μm.

The interlayer insulating films 90 to 98 have openings, respectively, at their portions overlapping the inner diameter area of the coil part 2. The magnetic layer M1 is present in the opening of the interlayer insulating film 90, and the magnetic layer M2 is present in the openings of the respective interlayer insulating films 91 to 98. As a result, the magnetic layers M1 and M2 contact each other through the opening of the interlayer insulating film 90. The interlayer insulating film 90 to 98 each have a protruding portion projecting toward the inner diameter area of the coil part 2.

The conductor layers L1 to L8 have coil patterns 10, 20, 30, 40, 50, 60, 70, and 80, respectively. The magnetic element body M is a composite member containing magnetic metal filler made of iron (Fe) or a permalloy-based material and a resin binder and forms a magnetic path for magnetic flux generated by a current flowing in the coil patterns 10, 20, 30, 40, 50, 60, 70, and 80. The resin binder may be epoxy resin of liquid or powder.

The terminal electrodes E1 and E2 are used as, for example, a primary-side terminal (unbalanced signal terminal), and the terminal electrodes E3 and E4 are used as, for example, a secondary-side terminal (balanced signal terminal). In this case, one of the terminal electrodes E1 and E2 constituting the unbalanced signal electrode is connected to an unbalanced transmission line, and the other one thereof is connected to a ground line. The terminal electrodes E3 and E4 are connected to a pair of balanced transmission lines, respectively.

The coil patterns 10, 30, 50, and 70 disposed respectively in the conductor layers L1, L3, L5, and L7 are connected between the terminal electrodes E1 and E2. The coil patterns 20, 40, 60, and 80 disposed respectively in the conductor layers L2, L4, L6, and L8 are connected between the terminal electrodes E3 and E4.

Figure 3:
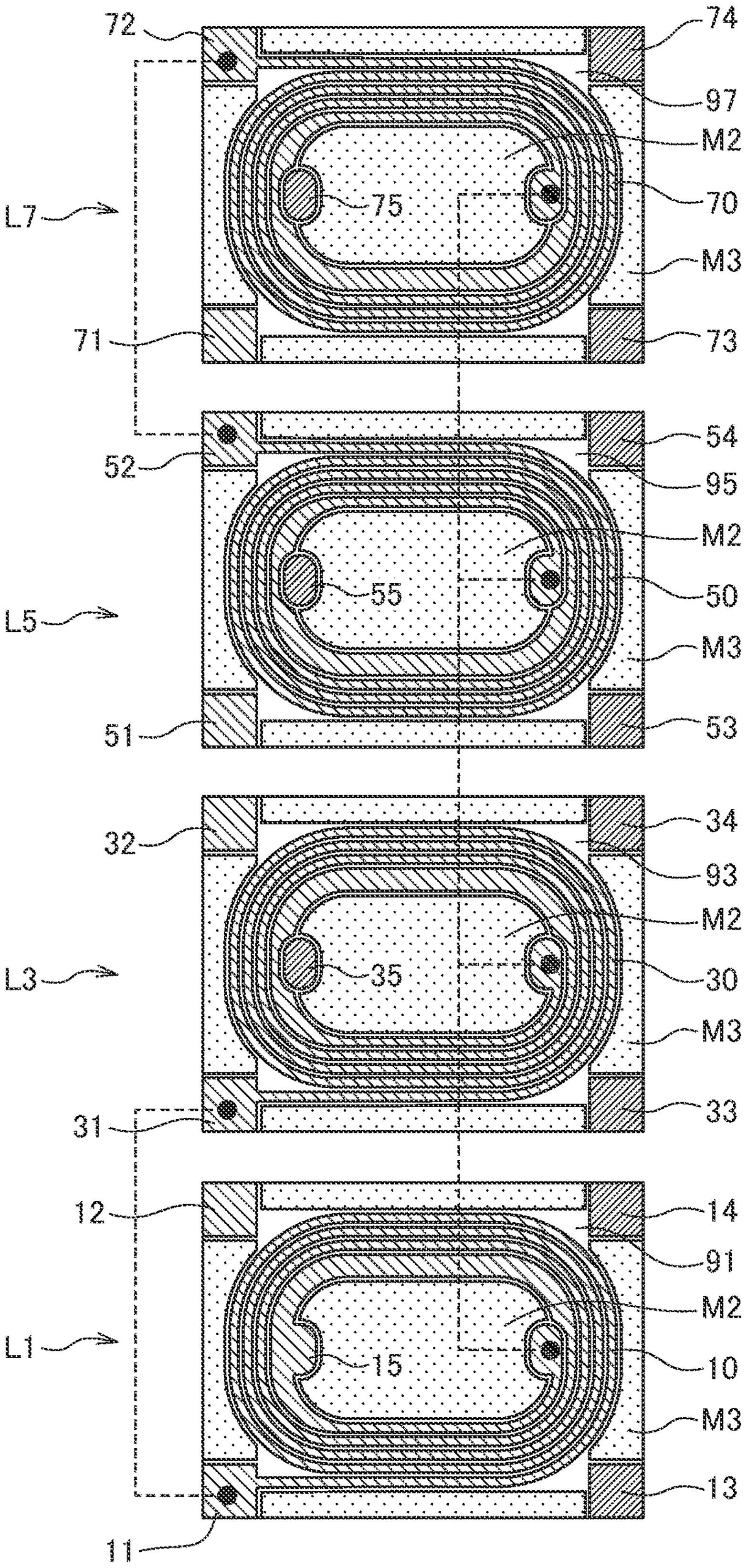
FIG. 3 is a schematic plan view for explaining the pattern shapes of the conductor layers L1, L3, L5, and L7 as viewed from the magnetic layer M1 side.

FIG. 3 is a schematic plan view for explaining the pattern shapes of the conductor layers L1, L3, L5, and L7 as viewed from the magnetic layer M1 side.

As illustrated in FIG. 3, the conductor layer L1 includes terminal patterns 11 to 14 in addition to the coil pattern 10, the conductor layer L3 includes terminal patterns 31 to 34 in addition to the coil pattern 30, the conductor layer L5 includes terminal patterns 51 to 54 in addition to the coil pattern 50, and the conductor layer L7 includes terminal patterns 71 to 74 in addition to the coil pattern 70. The terminal patterns 11, 31, 51, and 71 are short-circuited to one another, the terminal patterns 12, 32, 52, and 72 are short-circuited to one another, the terminal patterns 13, 33, 53, and 73 are short-circuited to one another, and the terminal patterns 14, 34, 54, and 74 are short-circuited to one another. The outer peripheral ends of the coil patterns 10 and 30 included respectively in the conductor layers L1 and L3 are connected to the terminal patterns 11 and 31, respectively. The outer peripheral ends of the coil patterns 50 and 70 included respectively in the conductor layers L5 and L7 are connected to the terminal patterns 52 and 72, respectively. The inner peripheral ends of the coil patterns 10, 30, 50, and 70 included respectively in the conductor layers L1, L3, L5, and L7 are short-circuited to one another.

The coil patterns 10 and 30 are wound counterclockwise (left-handed) from the outer peripheral end to the inner peripheral end, and the coil patterns 50 and 70 are wound clockwise (right-handed) from the outer peripheral end to the inner peripheral end. Relay patterns 35, 55, and 75 included respectively in the conductor layers L3, L5, and L7 are provided independently of the coil patterns 30, 50, and 70, respectively, and connected to the inner diameter ends of the coil patterns 20, 40, 60, and 80 to be described later. A dummy pattern 15 provided in the conductor layer L1 is provided for preventing a level difference from occurring at its corresponding portions in the upper conductor layers (L2 to L8).

Figure 4:
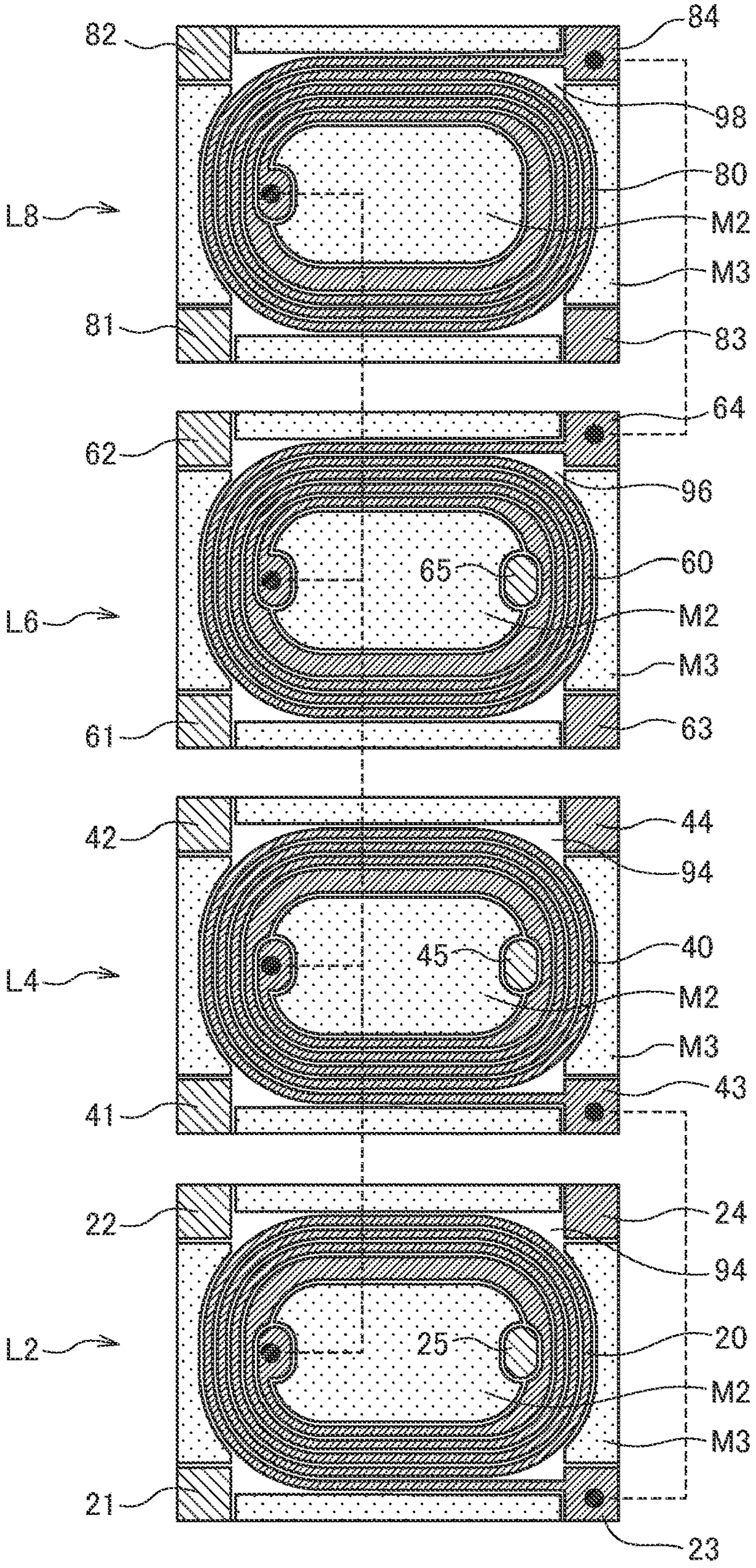
FIG. 4 is a schematic plan view for explaining the pattern shapes of the conductor layers L2, L4, L6, and L8 as viewed from the magnetic layer M1 side.

FIG. 4 is a schematic plan view for explaining the pattern shapes of the conductor layers L2, L4, L6, and L8 as viewed from the magnetic layer M1 side.

As illustrated in FIG. 4, the conductor layer L2 includes terminal patterns 21 to 24 in addition to the coil pattern 20, the conductor layer L4 includes terminal patterns 41 to 44 in addition to the coil pattern 40, the conductor layer L6 includes terminal patterns 61 to 64 in addition to the coil pattern 60, and the conductor layer L8 includes terminal patterns 81 to 84 in addition to the coil pattern 80. The terminal patterns 81 to 84 are connected respectively to the terminal electrodes E1 to E4 through via conductors provided in the interlayer insulating film 98. The terminal patterns 21, 41, 61, and 81 are short-circuited to one another, the terminal patterns 22, 42, 62, and 82 are short-circuited to one another, the terminal patterns 23, 43, 63, and 83 are short-circuited to one another, and the terminal patterns 24, 44, 64, and 84 are short-circuited to one another. The outer peripheral ends of the coil patterns 20 and 40 included respectively in the conductor layers L2 and L4 are connected to the terminal patterns 23 and 43, respectively. The outer peripheral ends of the coil patterns 60 and 80 included respectively in the conductor layers L6 and L8 are connected to the terminal patterns 64 and 84, respectively. The inner peripheral ends of the coil patterns 20, 40, 60, and 80 included respectively in the conductor layers L2, L4, L6, and L8 are short-circuited to one another.

The coil patterns 20 and 40 are wound clockwise (right-handed) from the outer peripheral end to the inner peripheral end, and the coil patterns 60 and 80 are wound counterclockwise (left-handed) from the outer peripheral end to the inner peripheral end. Relay patterns 25, 45, and 65 included respectively in the conductor layers L2, L4, and L6 are provided independently of the coil patterns 20, 40, and 60, respectively, and connected to the inner peripheral ends of the coil patterns 10, 30, 50, and 70.

The terminal patterns 11, 21, 31, 41, 51, 61, 71, and 81 are provided so as to overlap the terminal electrode E1 in a plan view and connected to one another through via conductors penetrating respectively the interlayer insulating films 91 to 97. The terminal patterns 12, 22, 32, 42, 52, 62, 72, and 82 are provided so as to overlap the terminal electrode E2 in a plan view and connected to one another through via conductors penetrating respectively the interlayer insulating films 91 to 97. The terminal patterns 13, 23, 33, 43, 53, 63, 73, and 83 are provided so as to overlap the terminal electrode E3 in a plan view and connected to one another through via conductors penetrating respectively the interlayer insulating films 92 to 97. The terminal patterns 14, 24, 34, 44, 54, 64, 74, and 84 are provided so as to overlap the terminal electrode E4 in a plan view and connected to one another through via conductors penetrating respectively the interlayer insulating films 92 to 97. The side surfaces of each terminal pattern are exposed from the interlayer insulating films 91 to 98 and covered with a barrel plating layer (P1 to P4) as in the case of the surface of each of the terminal electrodes E1 to E4.

Figure 5:
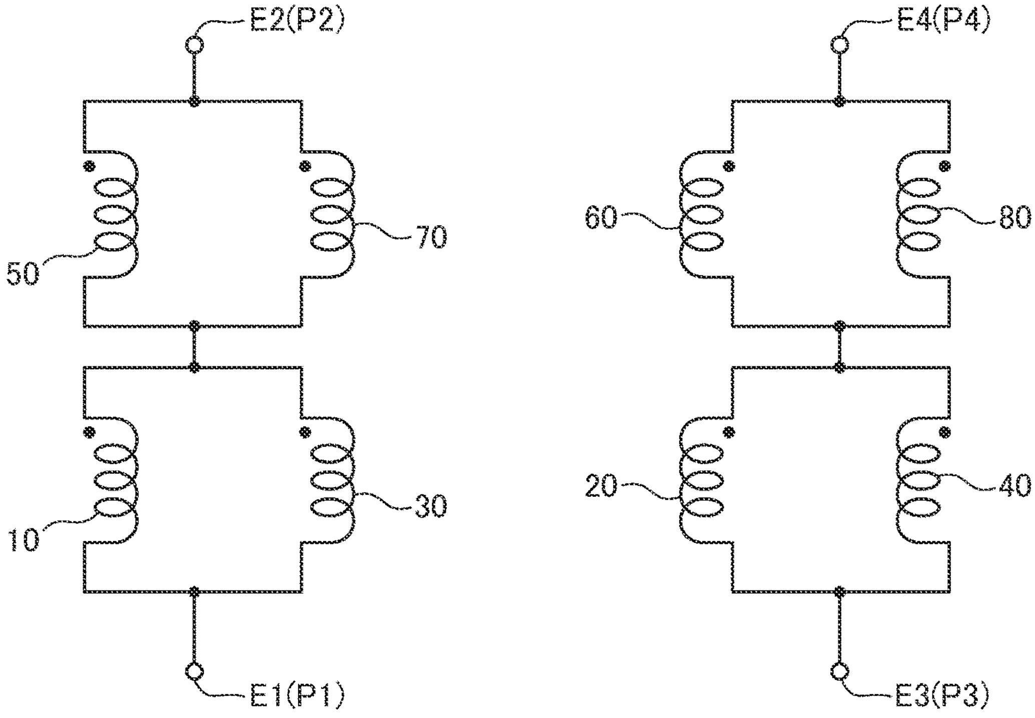
FIG. 5 is an equivalent circuit diagram of the coil component 1.

In the coil component 1 according to the present embodiment, the coil patterns 10, 30, 50, 70 and the coil patterns 20, 40, 60, and 80 are alternately and coaxially stacked. Thus, as illustrated in FIG. 5, which is an equivalent circuit diagram, the parallel-connected coil patterns 10, 30 and the parallel-connected coil patterns 50, 70 are connected in series between the terminal electrodes E1 and E2, and the parallel-connected coil patterns 20, 40 and the parallel-connected coil patterns 60, 80 are connected in series between the terminal electrodes E3 and E4. The number of turns of each of the coil patterns 10, 30, 50, and 70 is 4.5, and accordingly a coil of 9 turns in total is connected between the terminal electrodes E1 and E2. Similarly, the number of turns of each of the coil patterns 20, 40, 60, and 80 is 4.5, and accordingly a coil of 9 turns in total is connected between the terminal electrodes E3 and E4.

As described above, in the coil component 1 according to the present embodiment, the parallel-connected coil patterns 10, 30 and the parallel-connected coil patterns 20, 40 are coaxially stacked in this order, and the parallel-connected coil patterns 50, 70 and the parallel-connected coil patterns 60, 80 are coaxially stacked in this order, thus making it possible to enhance magnetic coupling between the coil patterns 10, 30, 50, and 70 constituting a primary-side winding and the coil patterns 20, 40, 60 and 80 constituting a secondary-side winding. In addition, the terminal electrodes E1 to E4 are connected to the outer peripheral ends of their corresponding coil patterns, facilitating connection between the coil patterns and the terminal electrodes E1 to E4.

Figure 6:
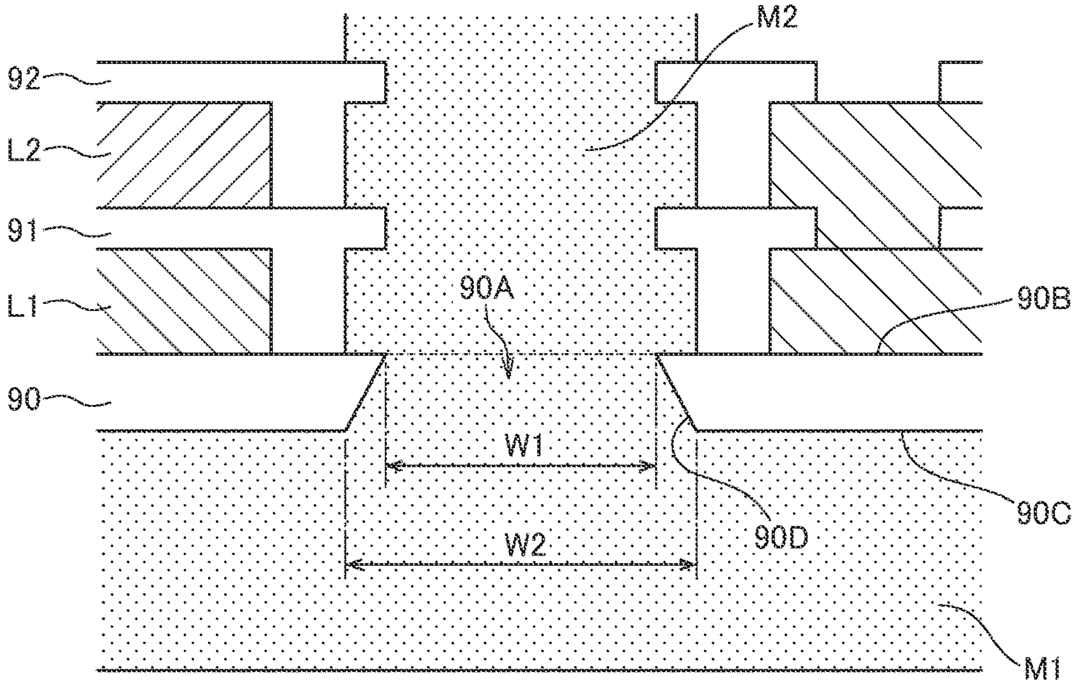
FIG. 6 is a partially enlarged view of the coil component 1.

In the present embodiment, the opening formed in the interlayer insulating film 90 has a tapered shape in cross section. More specifically, as illustrated in FIG. 6, which is an enlarged view, an opening 90A formed in the interlayer insulating film 90 has a configuration in which a diameter W1 on the side of an upper surface 90B of the interlayer insulating film 90 on which the conductor layer L1 is formed is smaller than a diameter W2 on the side of a lower surface 90C positioned opposite the upper surface 90B, and an inner wall 90D is tapered. Such a configuration makes voids less likely to occur in the magnetic layer M1 in a manufacturing process to be described later and facilitates passage of magnetic flux as compared to when the inner wall 90D is vertical, thereby increasing inductance.

Figure 7:
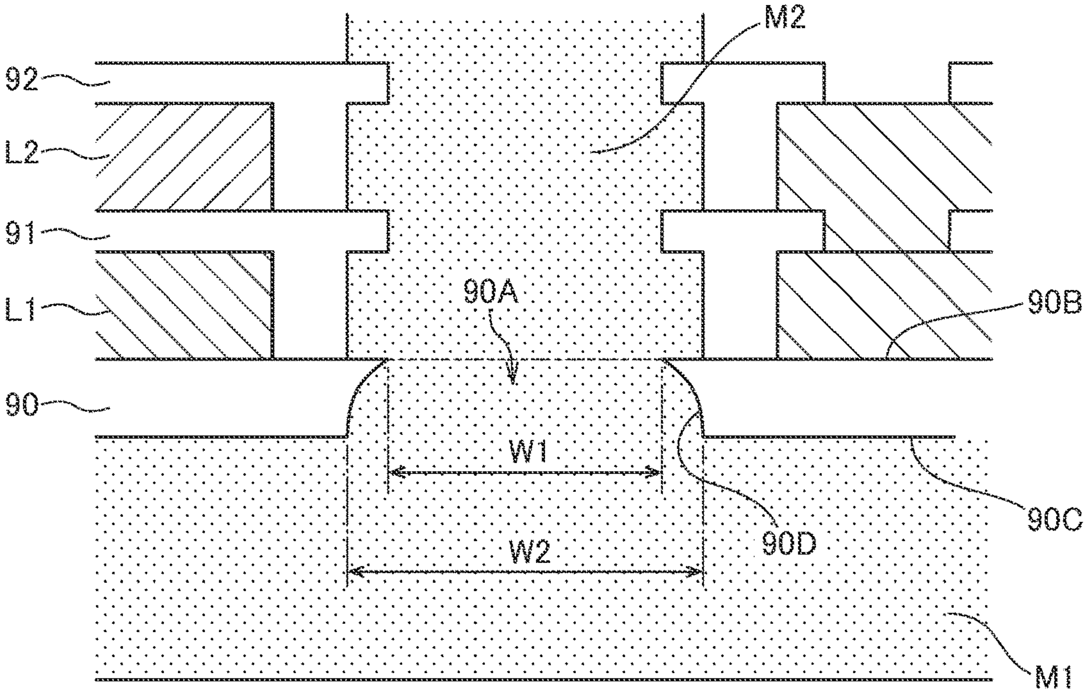
FIG. 7 is a partially enlarged view of the coil component 1 according to a first modification.
Figure 8:
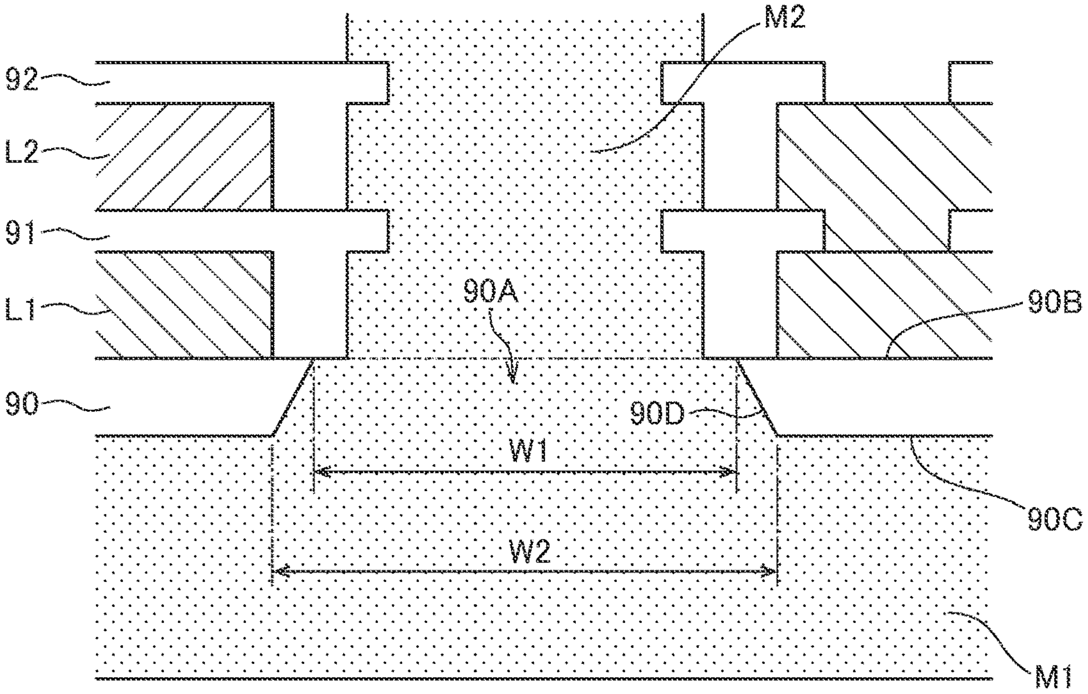
FIG. 8 is a partially enlarged view of the coil component 1 according to a second modification.

However, the inner wall 90D of the opening 90A need not necessarily have the tapered shape and only needs to have a shape in which the diameter of the opening 90A increases as the distance from the interface between the magnetic layers M1 and M2 increases. Therefore, as illustrated in FIG. 7 which is first a modification, the inner wall 90D of the opening 90A may be curved. In this case, the inner wall 90D of the opening 90A in the vicinity of the interface between the magnetic layers M1 and M2 becomes closer to horizontal, making voids less likely to occur in the magnetic layer M1. Further, as illustrated in FIG. 8, which is a second modification, the diameter W1 on the upper surface 90B side positioned at the interface between the magnetic layers M1 and M2 may be larger than the diameter of the magnetic layer M2. This increases the volume of the magnetic layer M1, further increasing inductance.

The following describes a manufacturing method for the coil component 1 according to the present embodiment.

FIGS. 9 to 21 are process views for explaining the manufacturing method for the coil component 1 according to the present embodiment. Although the process views illustrated in FIGS. 9 to 21 each illustrate a cross section corresponding to one coil component 1, multiple coil components 1 can actually be produced at a time using an aggregate substrate.

Figure 9:
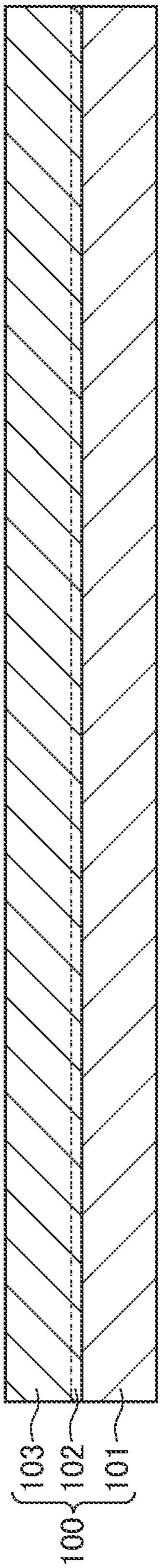
FIGS. 9 to 21 are process views for explaining the manufacturing method for the coil component 1.
Figure 10:
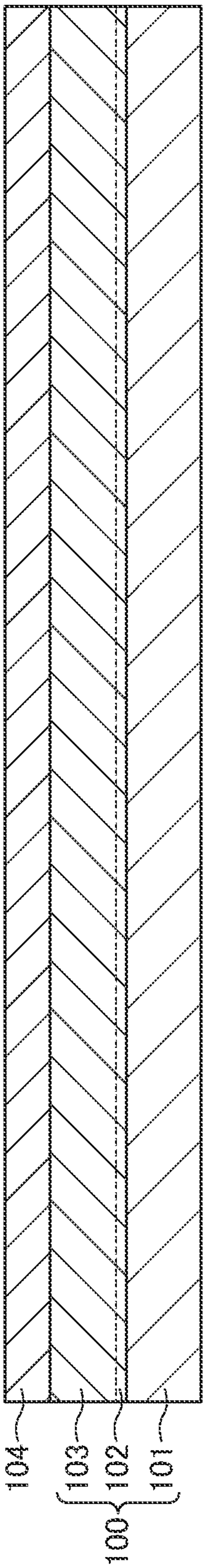

A support 100 having a structure in which metal foils 102 and 103 such as copper (Cu) foils are provided on the surface of a base 101 is prepared (FIG. 9). A peeling layer is provided at the interface between the metal foils 102 and 103. The metal foil 102 has a thickness of, e.g., 3 μm, and the metal foil 103 has a thickness of, e.g., 18 μm. Then, electrolytic plating is performed to form a metal foil 104 made of copper (Cu) or the like on the metal foil 103 to increase the total film thickness of the metal foils 102 to 104 (FIG. 10). The metal foil 104 has a thickness of, e.g., 20 μm.

Figure 11:
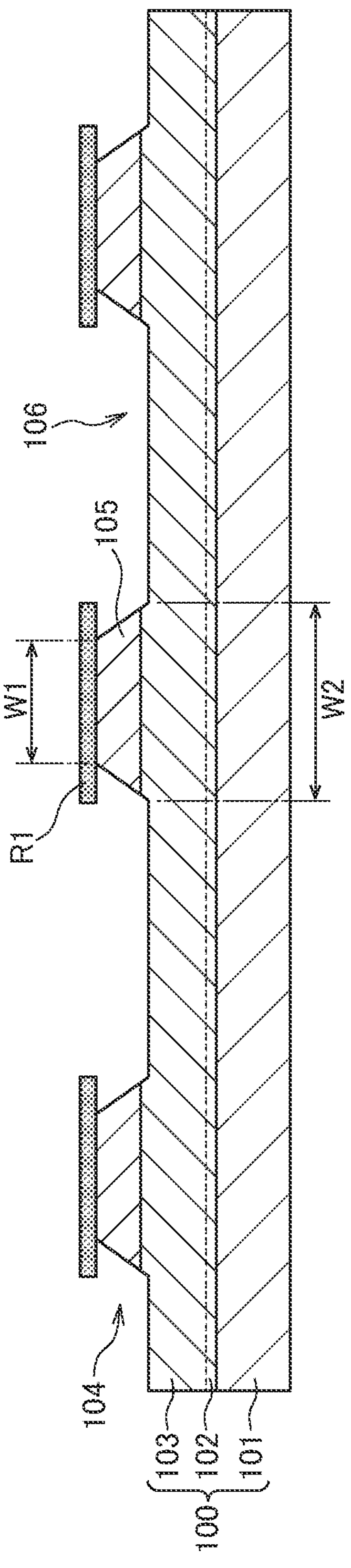

Then, after a resist pattern R1 is formed on the surface of the metal foil 104, the metal foil 104 is etched up to such a depth as to expose the metal foil 103 with the resist pattern R1 used as a mask (FIG. 11). The amount of etching may be slightly larger than the thickness of the metal foil 104. For example, when the thickness of the metal foil 104 is 20 μm, the etching amount can be set to about 24 μm. As a result, a protruding part 105 and a dented part 106 are formed in each of the metal foils 103 and 104. The etching is performed under the condition that the width of the protruding part 105 decreases as the distance from the bottom surface of the dented part 106 increases. As a result, the protruding part 105 has a width W1 at its top in contact with the resist pattern R1 and a width W2 (>W1) at its lower portion corresponding to the bottom of the dented part 106.

Figure 12:
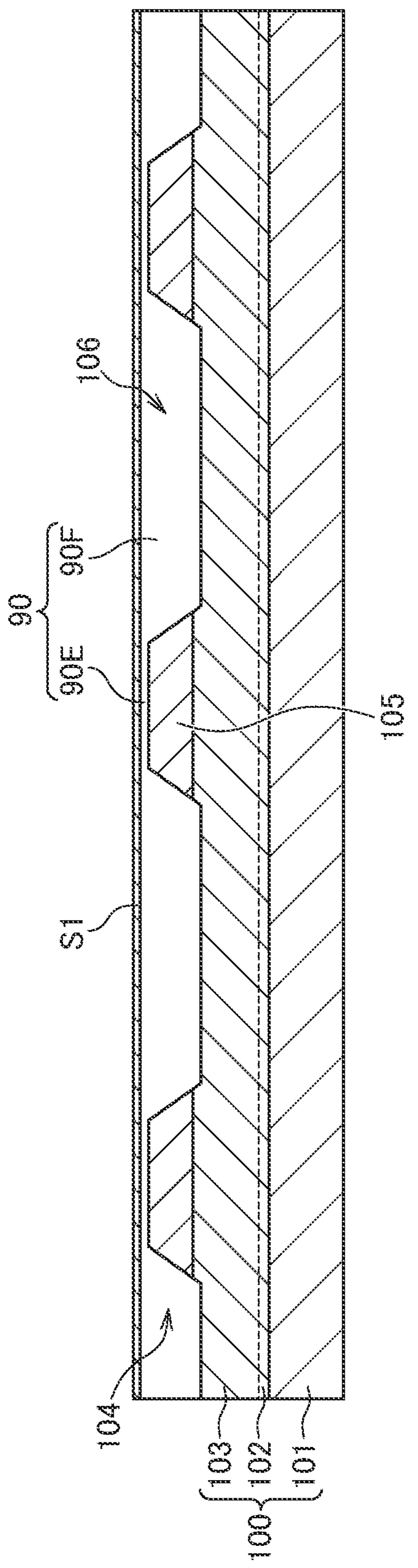

Then, after removal of the resist pattern R1, the surfaces of the metal foils 103 and 104 are covered with an insulating material by a laminate method to form the interlayer insulating film 90 (FIG. 12). Thus, the shapes of the protruding part 105 and dented part 106 are transferred to the interlayer insulating film 90, with the result that a thin part 90E corresponding to the shape of the protruding part 105 and a thick part 90F corresponding to the shape of the dented part 106 are formed in the interlayer insulating film 90. When fillers having a small particle diameter are used as fillers contained in the interlayer insulating film 90, it is possible to make the inner wall 90D of the opening 90A flatter. Thus, the mean particle diameter of the fillers contained in the interlayer insulating film 90 may be made smaller than the mean particle diameter of the fillers contained in the interlayer insulating films 91 to 98. After that, electroless plating is performed to form a seed layer S1 on the surface of the interlayer insulating film 90.

Figure 13:
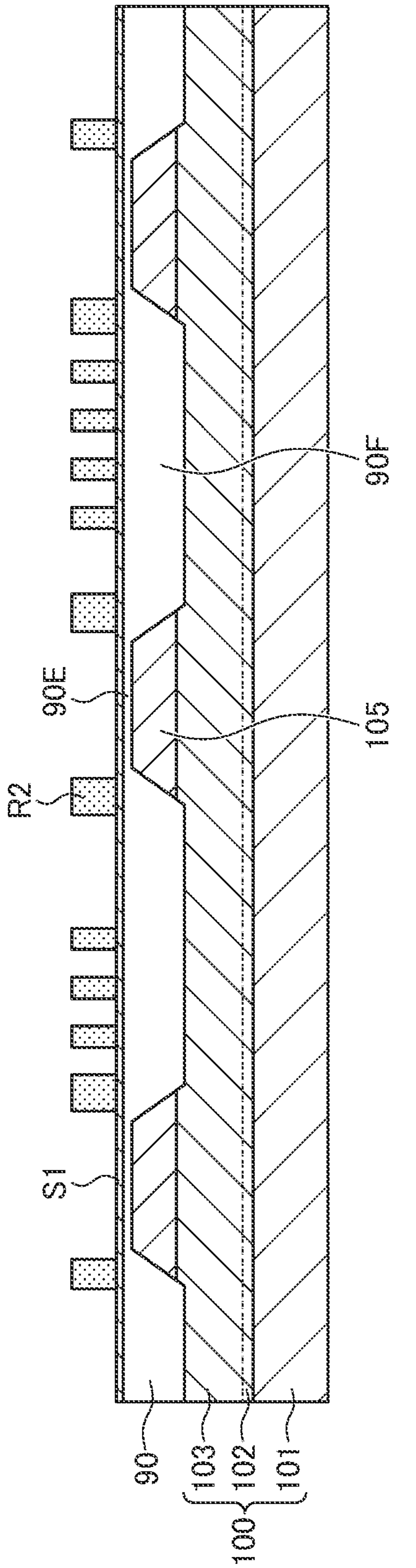
Figure 14:
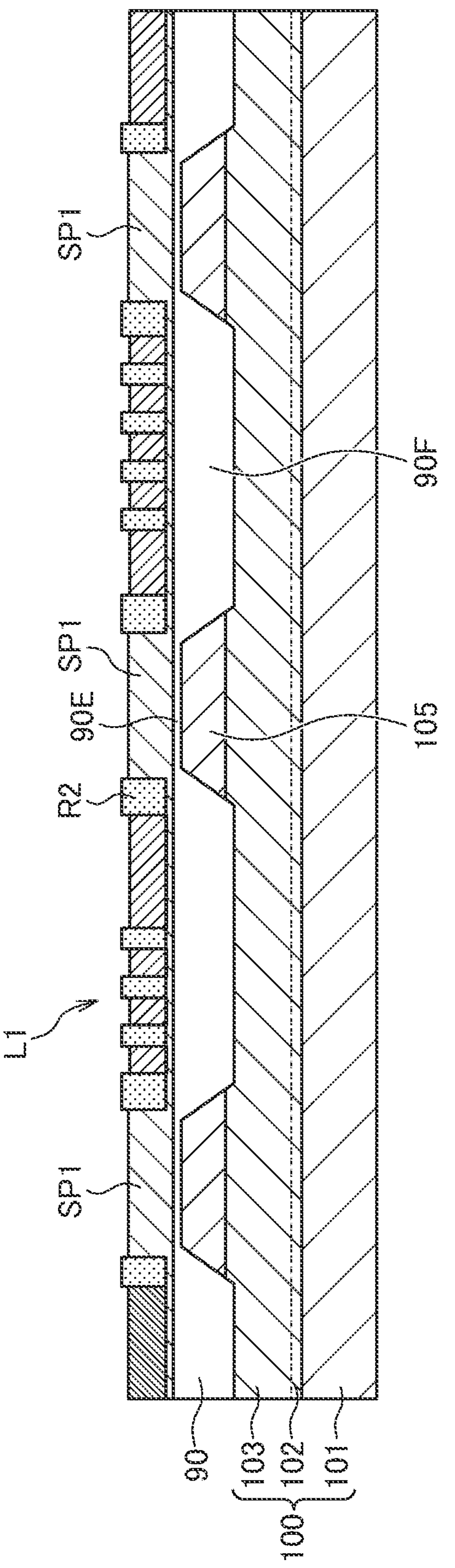

Then, a resist pattern R2 is formed on the surface of the seed layer S1 (FIG. 13). The resist pattern R2 serves as a negative pattern of the conductor layer L1. In this state, electrolytic plating is performed to grow the seed layer S1 to thereby form the conductor layer L1 (FIG. 14). At this time, a sacrificial pattern SP1 is formed in the inner and outer diameter areas of the coil pattern 10. The sacrificial pattern SP1 is formed at a position overlapping the thin part 90E of the interlayer insulating film 90 in a plan view. On the other hand, the coil pattern 10 is formed at a position overlapping the thick part 90F of the interlayer insulating film 90.

Figure 15:
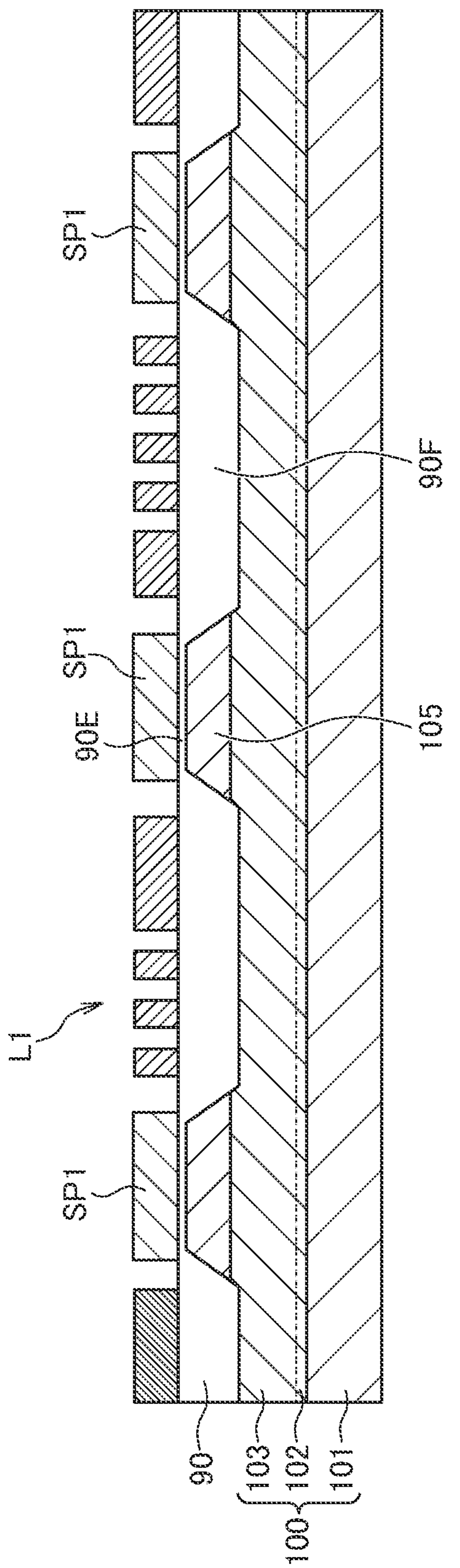

Accordingly, the inner diameter area of the coil pattern 10 overlaps the thin part 90E of the interlayer insulating film 90. Then, after peeling of the resist pattern R2, a part of the seed layer S1 that is exposed to the peeling portion of the resist pattern R2 is removed by etching, whereby the conductor layer L1 is completed (FIG. 15).

Figure 16:
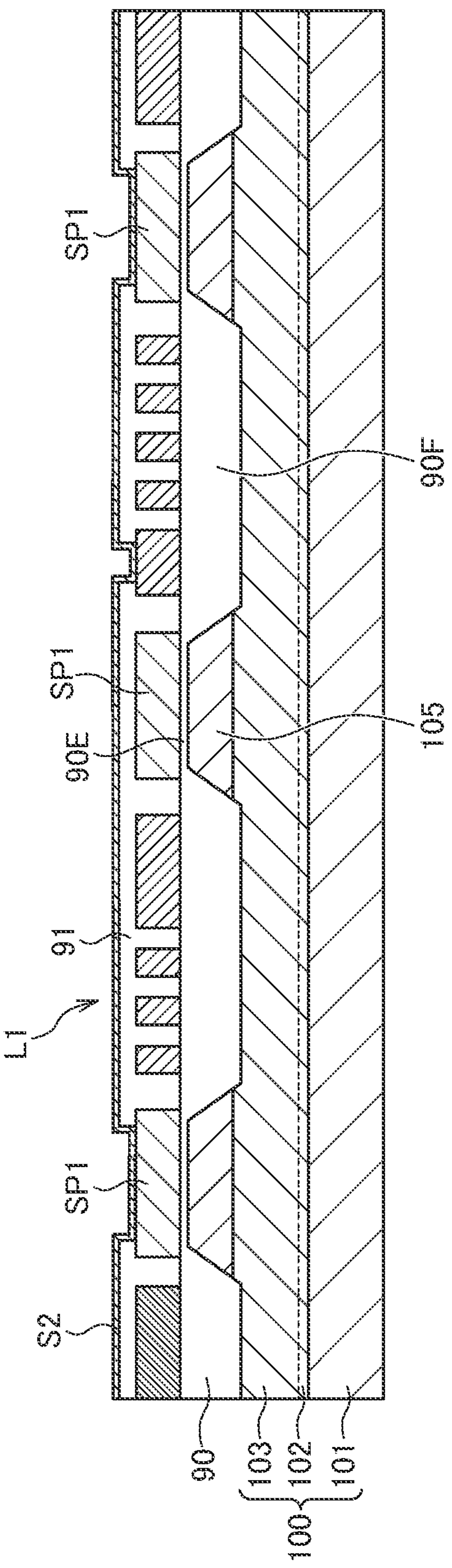
Figure 17:
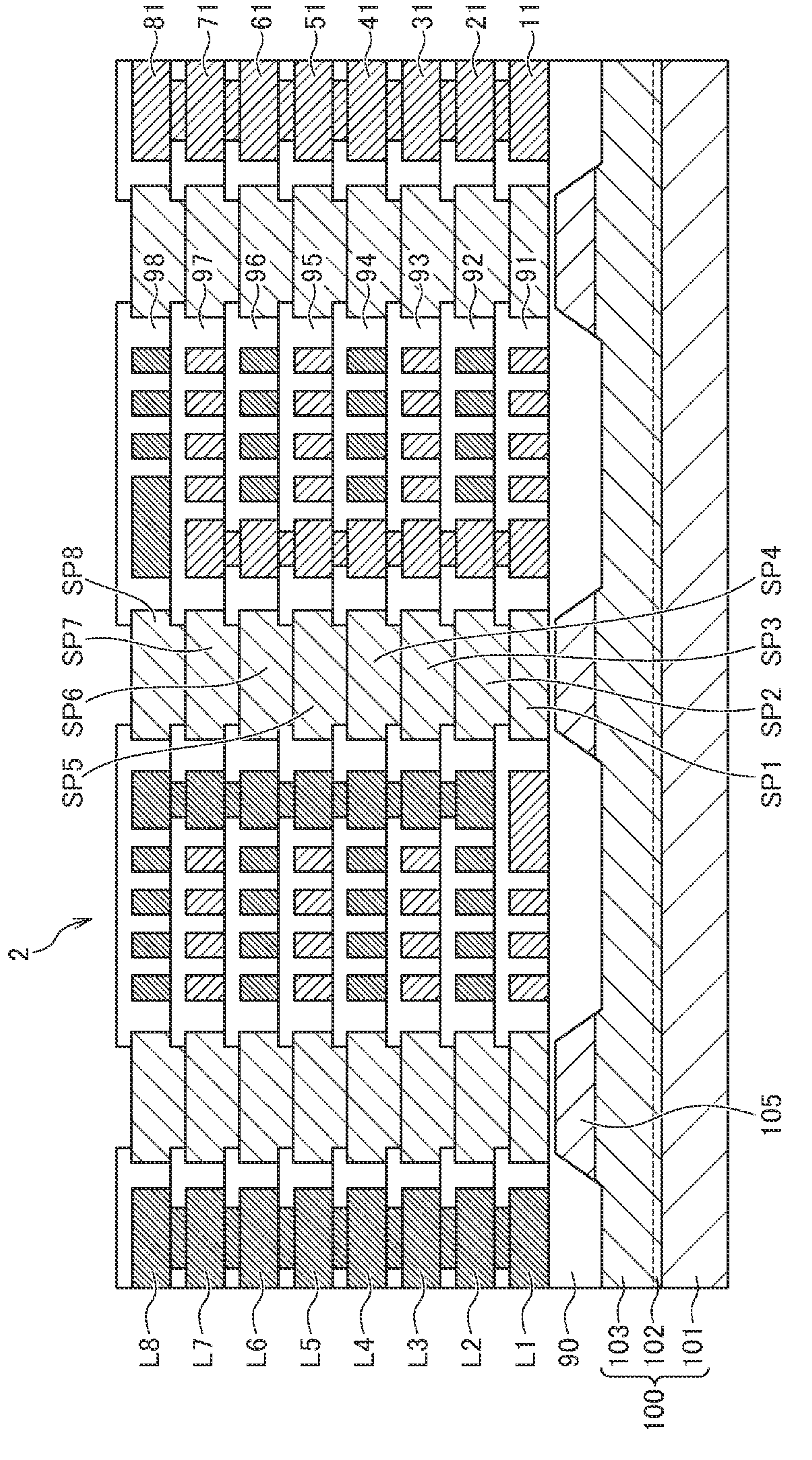
Figure 18:
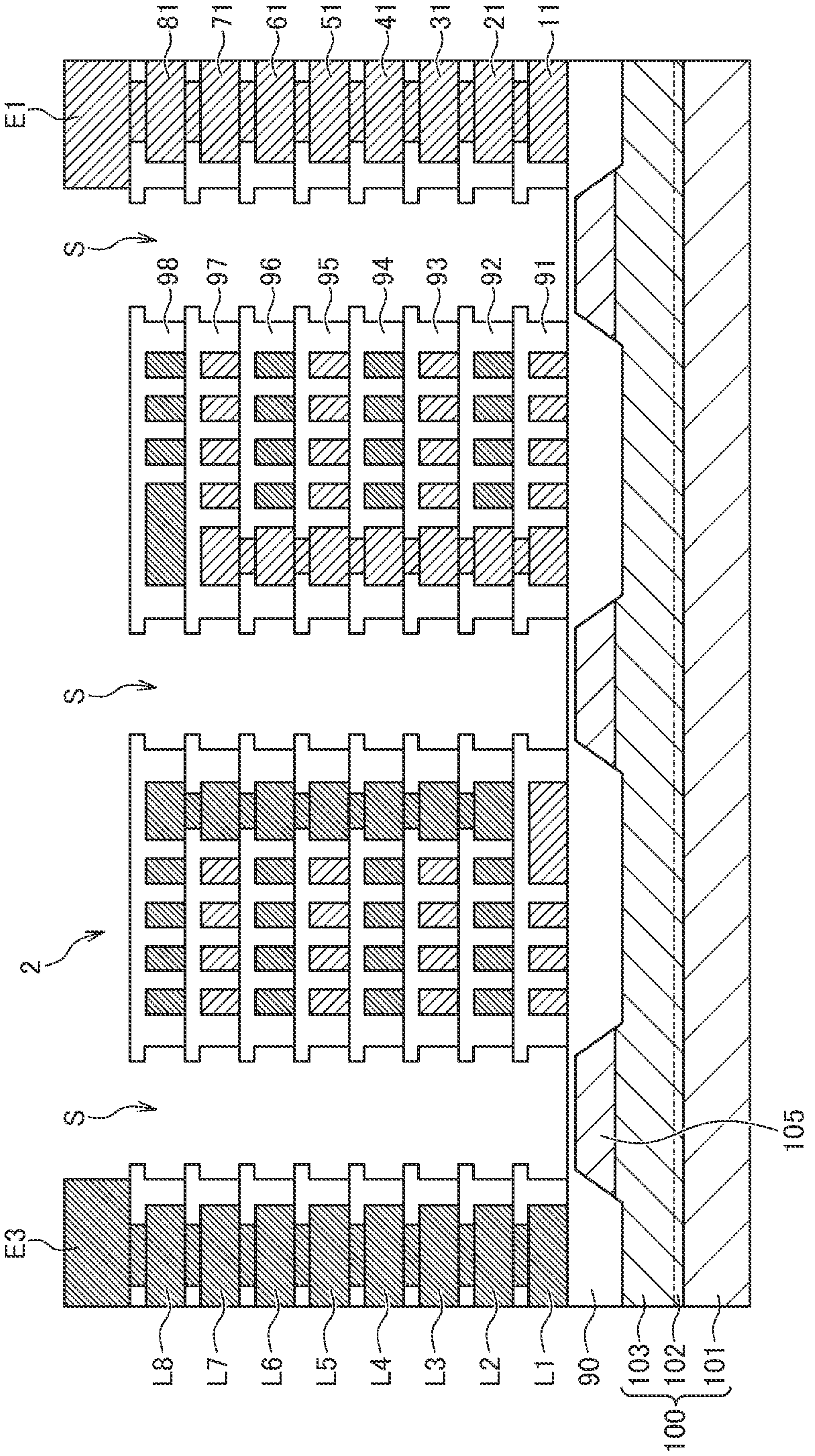

Then, after the interlayer insulating film 91 is formed so as to embed therein the conductor layer L1, vias are formed at positions where the via conductors are to be formed (FIG. 16). Thereafter, electroless plating is performed to form a seed layer S2 on the surface of the interlayer insulating film 91. Then, thereafter, the processes illustrated in FIGS. 13 to 16 are repeated to alternately form the conductor layers L2 to L8 and the interlayer insulating films 92 to 98 (FIG. 17). As a result, the coil part 2 is completed. Then, after vias are formed in the interlayer insulating film 98 to expose the terminal patterns 81 to 84, the terminal electrodes E1 to E4 are formed (FIG. 18). Then, wet-etching is performed with the terminal electrodes E1 to E4 covered with a not-shown resist pattern to remove the sacrificial patterns SP1 to SP8. The conductor patterns constituting the coil part 2 are covered with the interlayer insulating films 90 to 98 and are thus not etched. As a result, a space S is formed in the inner and outer diameter areas of the coil part 2. The terminal electrodes E1 to E4 may be formed after removal of the sacrificial patterns SP1 to SP8.

Figure 19:
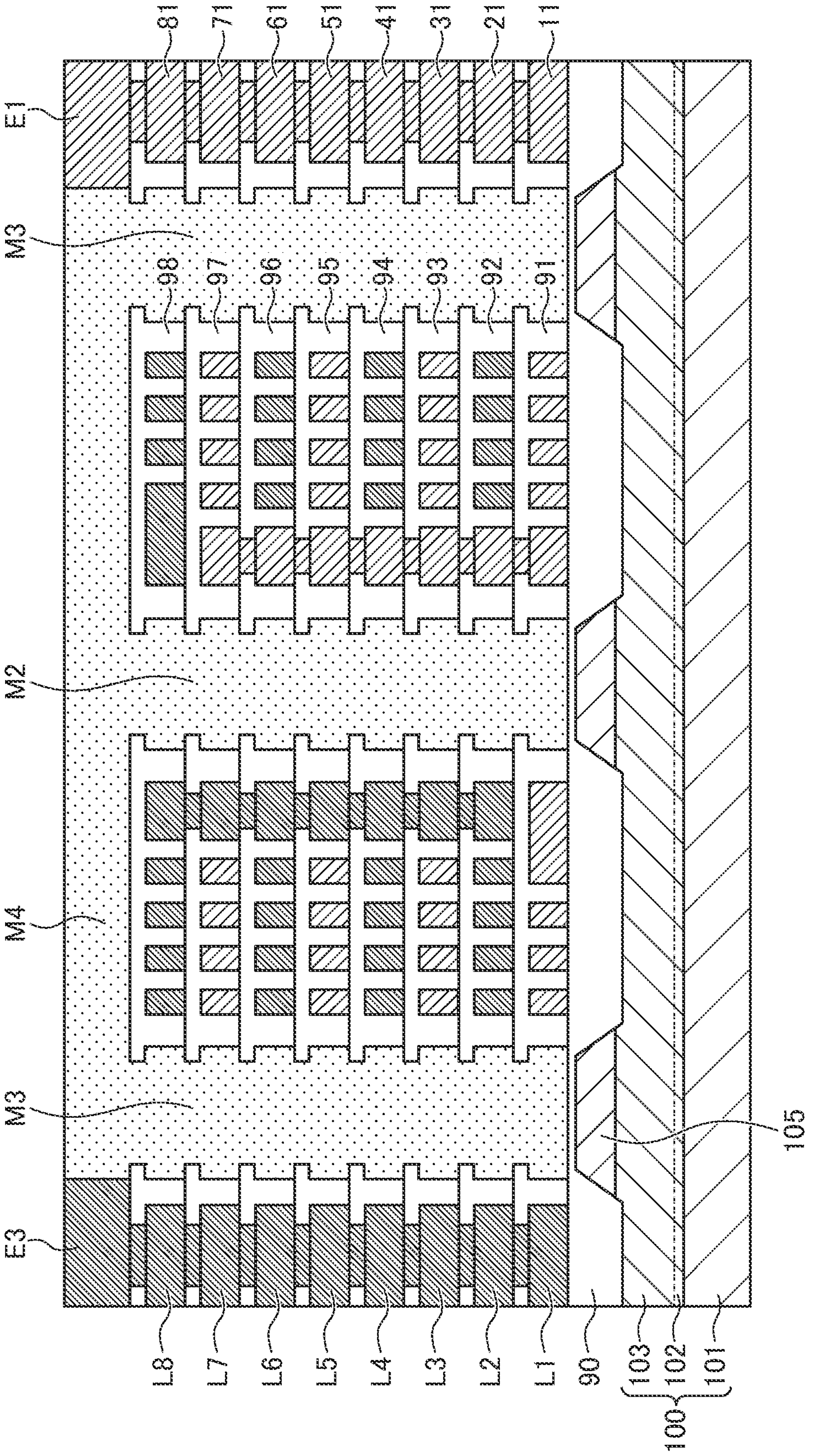
Figure 20:
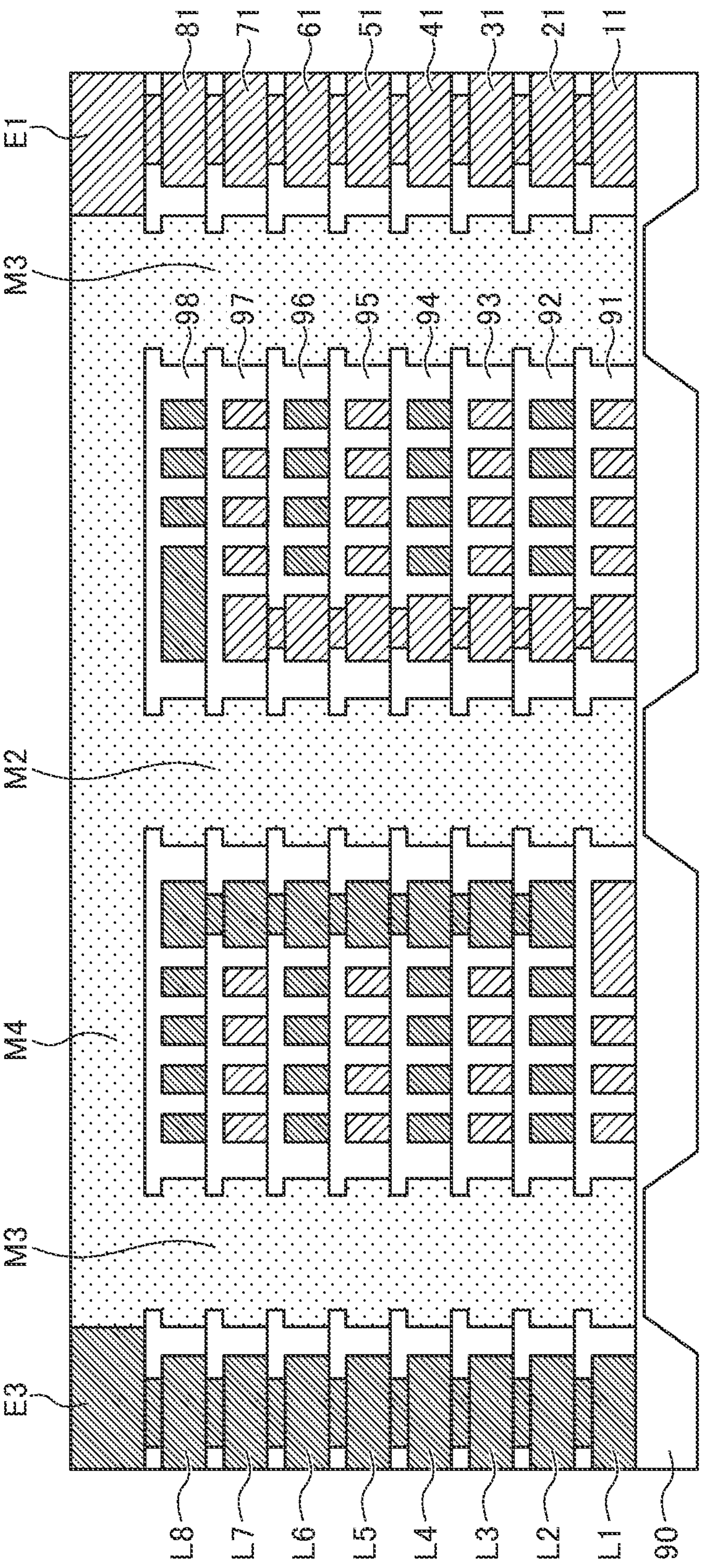
Figure 21:
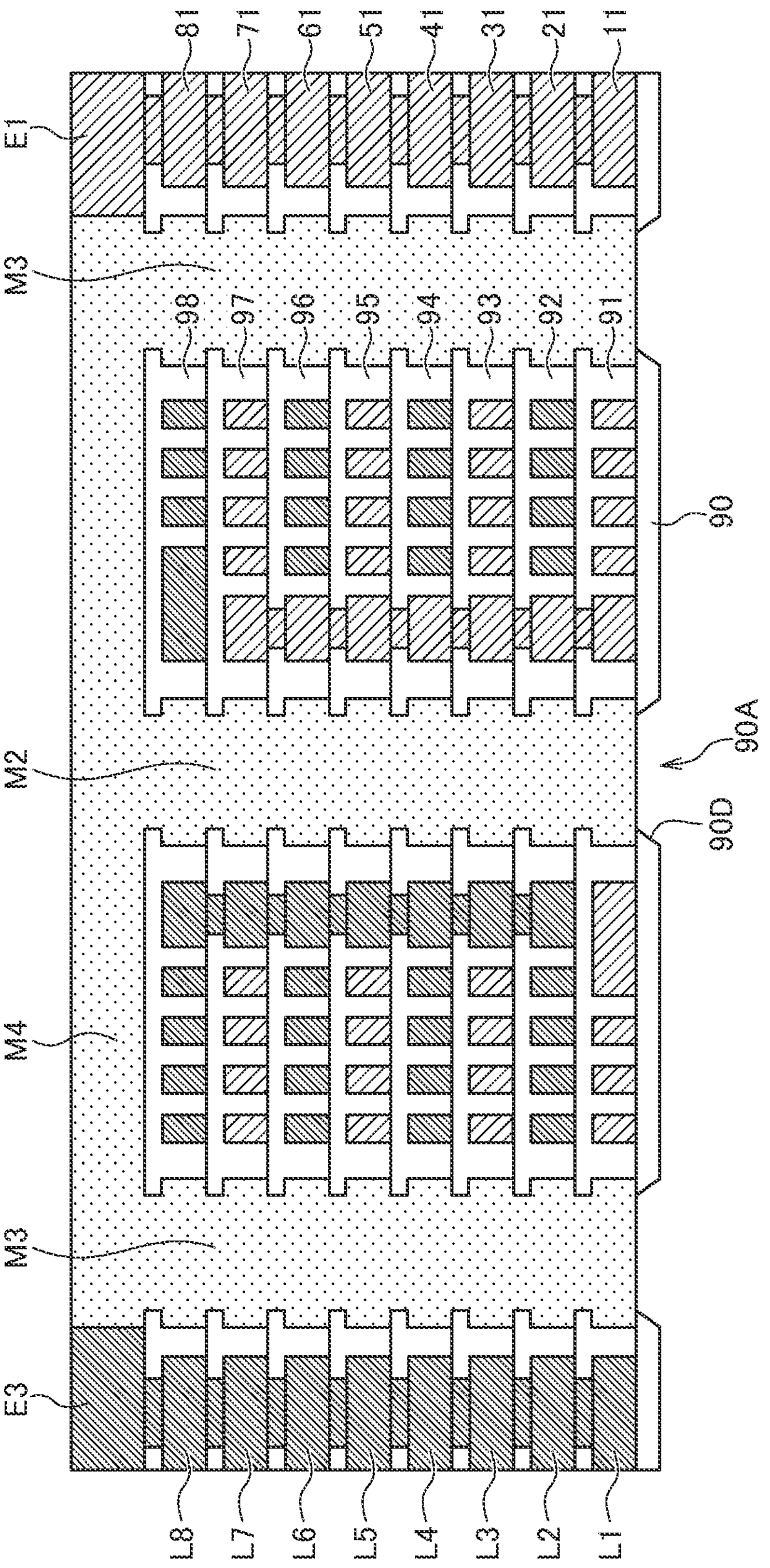

Then, the magnetic layers M2 to M4 are formed to fill the space S (FIG. 19). Then, the interface between the metal foils 102 and 103 is peeled to remove the support 100, and then the metal foils 103 and 104 are removed by etching (FIG. 20). As a result, the dent/bump surface of the interlayer insulating film 90 is exposed. In this state, ashing is performed to reduce the film thickness of the interlayer insulating film 90 as a whole (FIG. 21). The amount of reduction in the film thickness is adjusted such that the thin part 90E is removed to expose the magnetic layer M2 and that the thick part 90F remains. A portion where the thin part 90E is removed becomes the opening 90A, and the inner wall 90D thereof is tapered.

Then, the magnetic layer M1 is formed so as to cover the interlayer insulating film 90 (FIG. 2). The magnetic layer M1 is formed also inside the opening 90A, whereby the magnetic layers M1 and M2 contact each other. At this time, when the inner wall 90D of the opening 90A is vertical, voids are likely to occur at the corners; however, in the present embodiment, the inner wall 90D of the opening 90A is tapered, making voids less likely to occur. In particular, when fillers having a small particle diameter are used as fillers contained in the interlayer insulating film 90, the inner wall 90D of the opening 90A becomes flatter, making voids still less likely to occur. Finally, dicing is performed for singulation, and the barrel plating layers P1 to P4 are formed on the surfaces of the terminal electrodes E1 to E4, whereby the coil component 1 according to the present embodiment is completed.

As described above, in the present embodiment, the metal foils 103 and 104 are etched such that the width W2 of the protruding part 105 is larger than the width W1 thereof (W2>W1), and the resultant shape is transferred to the interlayer insulating film 90, so that the inner wall 90D of the opening 90A can be tapered off to thereby prevent voids from occurring in the magnetic layer M1. In addition, in the present embodiment, the metal foil 104 is formed on the metal foil 103 by electrolytic plating, so that the film thickness T0 of the interlayer insulating film 90 that ultimately remains there is sufficiently ensured. This prevents a short circuit failure through the magnetic layer M1 between the coil pattern 10 or the terminal patterns 11, 12 which belong to the primary side and terminal patterns 13, 14 which belong to the secondary side. On the other hand, a short circuit failure through the magnetic layer M4 between the terminal patterns 81, 82 which belong to the primary side and the coil pattern 80 or terminal patterns 83, 84 which belong to the secondary side can be prevented by sufficiently ensuring the film thickness of the interlayer insulating film 98 covering the conductor layer L8.

While the one embodiment of the present disclosure has been described, the present disclosure is not limited to the above embodiment, and various modifications may be made within the scope of the present disclosure, and all such modifications are included in the present disclosure.

For example, although the coil component 1 according to the above embodiment has the eight conductor layers L1 to L8, the number of the conductor layers is not limited to this. Further, a configuration in which two coil patterns positioned in mutually different conductor layers are connected in parallel is not essential. Further, the coil component according to the present disclosure is not limited to a balun transformer, and the present disclosure may be applied to coil components of any type as long as they have a plurality of coil patterns which are electrically isolated from one another.

The technology according to the present disclosure includes the following configuration examples but not limited thereto.

A coil component according to the present disclosure includes: a coil part having a structure in which a plurality of conductor layers each having a coil pattern are stacked in the coil axis direction through a plurality of interlayer insulating films; a first magnetic layer covering the coil part in the coil axis direction; and a second magnetic layer positioned in the inner diameter area of the coil part. The plurality of interlayer insulating films include a first interlayer insulating film positioned closest to the first magnetic layer. The first and second magnetic layers contact each other through an opening formed in the first interlayer insulating film. The opening has a shape whose diameter increases as the distance from the interface between the first and second magnetic layers increases.

According to the present disclosure, it is possible to make voids less likely to occur in the first magnetic layer filled in the opening and to facilitate passage of magnetic flux, thereby increasing inductance.

In the present disclosure, the plurality of interlayer insulating films further include a plurality of second interlayer insulating films different from the first interlayer insulating film. The first interlayer insulating film may have a film thickness larger than those of the second interlayer insulating films. Voids are more likely to occur in the opening when the film thickness of the first interlayer insulating film is large; however, even in this case, the occurrence of voids can be prevented.

The coil component according to the present disclosure may further include first and second terminal electrodes, the plurality of conductor layers may include a first conductor layer positioned closest to the first magnetic layer, and the first conductor layer may include a conductor pattern connected to the first terminal electrode and a conductor pattern connected to the second terminal electrode. When conductor patterns applied with different potentials are included in the first conductor layer, a short circuit failure through the first magnetic layer may occur; however, by sufficiently ensuring the film thickness of the first interlayer insulating film, such a short circuit failure can be prevented.

In the present disclosure, the mean particle diameter of the fillers contained in the first interlayer insulating film may be smaller than that of the fillers contained in the second interlayer insulating films. This makes the cross section of the opening flatter, and therefore, voids are less apt to occur.

In the present disclosure, the diameter of the opening at the interface between the first and second magnetic layers may be larger than the diameter of the second magnetic layer. This increases the volume of the first magnetic layer, thus further increasing inductance.

A coil component manufacturing method according to the present disclosure includes: a first step of forming a protruding part and a dented part in a metal foil provided on the surface of a base; a second step of covering the surface of the metal foil with an insulating member to form a first interlayer insulating film having a thin part to which the shape of the protruding part has been transferred and a thick part to which the shape of the dented part has been transferred; a third step of alternately stacking, on the first interlayer insulating film, a plurality of conductor layers each having a coil pattern whose inner diameter area overlaps the thin part and a plurality of second interlayer insulating films; a fourth step of filling a second magnetic layer in the inner diameter areas of the coil patterns; a fifth step of removing the metal foil to expose the first interlayer insulating film; a sixth step of removing the thin part so as to expose the second magnetic layer; and a seventh step of forming a first magnetic layer covering the first interlayer insulating film such that the first and second magnetic layers contact each other. In the first step, the protruding and dented parts are formed such that the width of the protruding part decreases as the distance from the bottom surface of the dented part increases.

According to the present disclosure, it is possible to form the first interlayer insulating film such that it has a shape in which the diameter of the opening formed therein increases as the distance from the interface between the first and second magnetic layers increases. This makes voids less likely to be formed in the first magnetic layer filled in the opening upon formation of the first magnetic layer.

In the present disclosure, the first step may be performed such that the dented part is formed in the metal foil by etching. Thus, by adjusting an etching condition, it is possible to obtain a structure in which the width of the protruding part decreases as the distance from the bottom surface of the dented part increases. In this case, before the first step, a step of increasing the film thickness of the metal foil may be performed by plating. This can further increase the film thickness of the first interlayer insulating film.

As described above, according to the present disclosure, it is possible to prevent, in a coil component having a structure in which a coil part is embedded in a magnetic element body, voids from occurring in the magnetic element body.

What is claimed is:

1. A coil component comprising:

a coil part having a structure in which a plurality of conductor layers each having a coil pattern are stacked in a coil axis direction through a plurality of interlayer insulating films;

a first magnetic layer covering the coil part in the coil axis direction; and a second magnetic layer positioned in an inner diameter area of the coil part, wherein the plurality of interlayer insulating films include a first interlayer insulating film positioned closest to the first magnetic layer, wherein the first and second magnetic layers contact each other through an opening formed in the first interlayer insulating film, wherein the opening has a shape whose diameter increases as a distance from an interface between the first and second magnetic layers increases, wherein the coil component further comprises a third magnetic layer provided in an outside area of the coil part, wherein the first and third magnetic layers contact each other through another opening formed in the first interlayer insulating film, and wherein the another opening has a shape whose diameter increases as a distance from an interface between the first and third magnetic layers increases.

2. The coil component as claimed in claim 1, wherein the plurality of interlayer insulating films further include a plurality of second interlayer insulating films different from the first interlayer insulating film, and wherein the first interlayer insulating film has a film thickness larger than those of the second interlayer insulating films.

3. The coil component as claimed in claim 2, further comprising first and second terminal electrodes, wherein the plurality of conductor layers include a first conductor layer positioned closest to the first magnetic layer, and wherein the first conductor layer includes a first conductor pattern connected to the first terminal electrode and a second conductor pattern connected to the second terminal electrode.

4. The coil component as claimed in claim 2, wherein a mean particle diameter of fillers contained in the first interlayer insulating film is smaller than that of fillers contained in the second interlayer insulating films.

5. The coil component as claimed in claim 1, wherein the first magnetic layer includes a first part covering the coil part in the coil axis direction from one side and a second part embedded in the opening, and wherein the first part of the first magnetic layer and the second part of the first magnetic layer are made of a same magnetic material.

6. The coil component as claimed in claim 5, wherein the first part of the first magnetic layer and the second part of the first magnetic layer are integrated together so as not to form a boundary therebetween.

7. The coil component as claimed in claim 1, further comprising a fourth magnetic layer covering the coil part in the coil axis direction from another side, wherein the second, third, and fourth magnetic layers are made of a same magnetic material.

8. The coil component as claimed in claim 7, wherein the second magnetic layer and the fourth magnetic layer are integrated together so as not to form a boundary therebetween, and wherein the third magnetic layer and the fourth magnetic layer are integrated together so as not to form a boundary therebetween.

* * * * *